United States Patent
Fang et al.

(10) Patent No.: US 12,511,484 B2
(45) Date of Patent: Dec. 30, 2025

(54) METHOD FOR POINT-OF-INTEREST INFORMATION MANAGEMENT, ELECTRONIC DEVICE, AND STORAGE MEDIUM

(71) Applicant: PATEO CONNECT+ (NANJING) CO., LTD., Jiangsu (CN)

(72) Inventors: Jianwei Fang, Shanghai (CN); Qi Xiang, Shanghai (CN); Ping Xu, Shanghai (CN)

(73) Assignee: PATEO CONNECT+ TECHNOLOGY (SHANGHAI) CORPORATION, Shanghai (CN)

(\*) Notice: Subject to any disclaimer, the term of this patent is extended or adjusted under 35 U.S.C. 154(b) by 313 days.

(21) Appl. No.: 18/031,461

(22) PCT Filed: Oct. 27, 2021

(86) PCT No.: PCT/CN2021/126663
§ 371 (c)(1),
(2) Date: Apr. 12, 2023

(87) PCT Pub. No.: WO2022/089474
PCT Pub. Date: May 5, 2022

(65) Prior Publication Data
US 2023/0376691 A1    Nov. 23, 2023

(30) Foreign Application Priority Data
Oct. 27, 2020   (CN) .......................... 202011161539.7

(51) Int. Cl.
G06F 40/295   (2020.01)
G06F 16/9537   (2019.01)
(Continued)

(52) U.S. Cl.
CPC ........ *G06F 40/295* (2020.01); *G06F 16/9537* (2019.01); *G06F 16/9558* (2019.01); *G06F 40/242* (2020.01)

(58) Field of Classification Search
CPC .. G06F 40/295; G06F 40/242; G06F 16/9537; G06F 16/9558; G06F 16/3334;
(Continued)

(56) References Cited

U.S. PATENT DOCUMENTS 8,856,671 B2 \* 10/2014 Halbherr ............ G01C 21/3679
715/769
11,563,592 B2 \* 1/2023 Raleigh ............. H04M 15/8094
(Continued)

FOREIGN PATENT DOCUMENTS

CN    101750070 A    6/2010
CN    102841920 A    12/2012
(Continued)

OTHER PUBLICATIONS

Wang Song Method and device for extracting page information Jan. 15, 2014 Beijing Baidu Netcom Sci & Tec CN103514234 (A) paras. 2-308, Claim 1-22, Figs. 1-8 English.\*

(Continued)

*Primary Examiner* — Prabodh M Dharia
(74) *Attorney, Agent, or Firm* — ANOVA LAW GROUP, PLLC

(57) ABSTRACT

A point-of-interest (POI) information management method includes: obtaining a webpage link; obtaining a webpage text associated with the webpage link; obtaining at least one item of POI information matching the webpage text from a POI information repository; presenting the at least one item of the POI information; in response to a pre-determined operation being performed on a first item of the POI information of the at least one item of the POI information,
(Continued)

presenting a route from a current location to an address indicated in the first item of the POI information and a first operable icon; and in response to detecting another predetermined operation is performed on the first operable icon, setting the route as a target trip.

20 Claims, 13 Drawing Sheets

(51) Int. Cl.
    *G06F 16/955*    (2019.01)
    *G06F 40/242*    (2020.01)

(58) Field of Classification Search
    CPC ......... G06F 16/90332; G06F 16/90344; G06F 16/906; G06F 9/543; G06N 3/045
    USPC .......................... 345/650; 701/533; 707/812
    See application file for complete search history.

(56) References Cited

U.S. PATENT DOCUMENTS

| | | | |
|---|---|---|---|
| 2010/0106506 | A1 | 4/2010 | Carter et al. |
| 2011/0093515 | A1* | 4/2011 | Albanese ............... G06Q 30/02 707/812 |
| 2015/0134247 | A1* | 5/2015 | Kobuya ............. G01C 21/3682 701/533 |
| 2019/0370763 | A1* | 12/2019 | Paintin ................... G06Q 20/10 |
| 2020/0057788 | A1* | 2/2020 | Huang .................. G06F 16/953 |
| 2023/0082174 | A1* | 3/2023 | Thomas ................ G06F 3/0482 715/234 |
| 2025/0111405 | A1* | 4/2025 | McEachran ........ G06Q 30/0242 |

FOREIGN PATENT DOCUMENTS

| | | |
|---|---|---|
| CN | 103514234 A | 1/2014 |
| CN | 103984771 A | 8/2014 |
| CN | 110457420 A | 11/2019 |
| CN | 112000495 A | 11/2020 |

OTHER PUBLICATIONS

Wang Song Method and device for extracting page information Jan. 15, 2014 Beijing Baidu Netcom Sci & Tec CN103514234 (A) paras. 2-308, Claim 1-22, Figs. 1-8 Chinese.*

The World Intellectual Property Organization (WIPO) International Search Report for PCT/CN2021/126663 Feb. 9, 2022 6 Pages (including translation).

* cited by examiner

METHOD FOR POINT-OF-INTEREST INFORMATION MANAGEMENT, ELECTRONIC DEVICE, AND STORAGE MEDIUM

CROSS-REFERENCE TO RELATED APPLICATION

This application is a national stage application of International Application No. PCT/CN2021/126663, filed Oct. 27, 2021, which claims priority to Chinese Patent Application No. 202011161539.7, filed with the China National Intellectual Property Administration (CNIPA) on Oct. 27, 2020, the entire contents of all of which are incorporated herein by reference.

TECHNICAL FIELD

The present disclosure relates to the technical field of information technologies and, more particularly, to a method, an electronic device, and a computer storage medium for point-of-interest information management.

BACKGROUND

Users often read articles about food and travel in various applications (or apps) or websites. The articles will mention point-of-interests (POIs) such as names of attractions, addresses of hotels, etc. Traditionally, the users can bookmark articles containing their favorite POIs in these apps or websites for later search or travel planning. But because these apps or websites are numerous and scattered (or unorganized), and these articles are often scattered (or unorganized), it becomes inconvenient to find these POIs. In addition, even if a user can find an article, the user often needs to read the article again to find the POIs, which is more laborious.

SUMMARY

The present disclosure provides a method for the POI information management, an electronic device, and a computer-readable storage medium, capable of extracting the POI information from a shared webpage link and presenting the extracted POI information, and facilitating a unified collection. In addition, the method for the POI information management, the electronic device, and the computer-readable storage medium provided by the embodiments of the present disclosure support one-stop POI information management, eliminates the need for users to search relevant articles in various applications or websites and manually extract the POI information, and improves an efficiency of reading and searching.

One aspect of the present disclosure provides a point-of-interest (POI) information management method. The method includes: obtaining a webpage link; obtaining a webpage text associated with the webpage link; obtaining at least one item of POI information matching the webpage text from a POI information repository; and presenting the at least one item of the POI information.

In some embodiments, the method further includes obtaining the webpage link from a clipboard, or obtaining the webpage link through a sharing module.

In some embodiments, the method further includes: in response to a predetermined operation being performed on a first item of the POI information of the at least one item of the POI information, presenting a route from a current location to an address indicated in the first item of the POI information and a first operable icon; and in response to detecting another pre-determined operation is performed on the first operable icon, setting the route as a target trip.

In some embodiments, obtaining the at least one item of the POI information matching the webpage text from the POI information repository includes: determining a content category of the webpage text; in response to the content category being determined to be a first content category, obtaining a set of address information from the webpage text based on an address matching rule; obtaining items of the POI information matching the set of address information from the POI information repository, the items of the POI information including a plurality of POI identifiers; determining at least one POI identifier that matches the webpage text from the plurality of POI identifiers based on a natural language processing model; and obtaining the POI information associated with the at least one POI identifier from the items of the POI information to be the at least one item of the POI information.

In some embodiments, obtaining the at least one item of the POI information matching the webpage text from the POI information repository includes: determining the content category of the webpage text; in response to the content category being determined to be a second content category, determining at least one word tagged with a pre-determined tag from the webpage text based on an entity recognition model; and obtaining the POI information associated with the at least one word from the POI information repository to be the at least one item of the POI information.

In some embodiments, determining the content category of the webpage text includes: determining a first frequency of a first term associated with the first content category and a second frequency of a second term associated with the second content category in the webpage text; and in response to determination of the first frequency being greater than the second frequency, determining the content category to be the first content category; or in response to determination of the first frequency being smaller than the second frequency, determining the content category to be the second content category; or in response to determination of the first frequency being equal to the second frequency, obtaining a set of words matching a word database from the webpage text and inputting the set of words into a text classification model to determine whether the content category is the first content category or the second content category.

In some embodiments, determining the first frequency and the second frequency includes: obtaining title information from the webpage text; and determining the first frequency of the first term associated with the first content category and the second frequency of the second term associated with the second content category in the title information.

In some embodiments, determining the at least one POI identifier that matches the webpage text from the plurality of POI identifiers based on the natural language processing model includes: generating a dictionary based on the plurality of POI identifiers; performing a word segmentation process on the webpage text according to the dictionary based on the natural language processing model to obtain a word segmentation result; and determining the at least one POI identifier that matches the word segmentation result in the dictionary.

In some embodiments, determining the at least one POI identifier that matches the webpage text from the plurality of POI identifiers based on the natural language processing model further includes: determining at least one frequency of the at least one POI identifier in the word segmentation result; and according to the at least one frequency, sorting the at least one POI identifier.

In some embodiments, determining the at least one POI identifier that matches the webpage text from the plurality of POI identifiers based on the natural language processing model further includes: deleting the POI identifier whose frequency in the word segmentation result is lower than a pre-determined frequency threshold from the at least one POI identifier that has been sorted.

In some embodiments, obtaining the POI information associated with the at least one word from the POI information repository to be the at least one item of the POI information includes: determining region identifiers tagged as location tags from the webpage text based on the entity recognition model; determining a first region identifier with the highest frequency occurring in the webpage text from the region identifiers; and obtaining from the POI information repository the at least one item of the POI information that is located within a region associated with the first region identifier and that matches the at least one word.

In some embodiments, the method further includes: obtaining an image associated with the webpage link; obtaining text information from the image based on a text recognition model; obtaining a first POI location matching the text information from the POI information repository; determining at least one first credibility score associated with the at least one item of the POI information based on a distance between the at least one POI location in the at least one item of the POI information and the first POI location; obtaining at least one item of user evaluation data associated with the at least one item of the POI information from a predetermined server; based on the at least one item of user evaluation data, determining at least one second credibility score associated with the at least one item of the POI information; based on the at least one first credibility score and the at least one second credibility score, determining at least one final credibility score associated with the at least one item of the POI information; and presenting the at least one final credibility score.

In some embodiments, presenting the at least one item of the POI information includes: based on the at least one final credibility score, sorting the at least one item of the POI information to obtain a sorted result; and presenting the sorted result.

In some embodiments, the method further includes: presenting at least one selectable icon associated with the at least one item of the POI information; and in response to a selection operation being performed on a first selectable icon of the at least one selectable icon, adding the first item of the POI information associated with the first selectable icon to a favorite POI list.

Another aspect of the present disclosure provides an electronic device. The electronic device includes: at least one processor; and a memory coupled to the at least one processor. The memory stores instructions being executed by the at least one processor, and when being executed by the at least one processor, the instructions cause the at least one processor to perform the disclosed method.

Another aspect of the present disclosure provides a non-volatile computer-readable storage medium storing computer instructions. When being executed by at least one processor, the instructions cause the at least one processor to perform the disclosed method.

It should be understood that the description is not intended to identify key or critical features of embodiments of the disclosure, nor is it intended to limit the scope of the present disclosure. Other features of the present disclosure will become readily understood from the following description.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Exemplary embodiments of the present disclosure will be described in detail below with reference to the accompanying drawings, which include various details of the embodiments of the present disclosure to facilitate understanding and should be considered as exemplary only. Accordingly, those of ordinary skill in the art will recognize that various changes and modifications of the embodiments described herein can be made without departing from the scope and spirit of the present disclosure. Also, descriptions of well-known functions and constructions are omitted from the following description for clarity and conciseness.

As used herein, the term "including" and variations thereof mean open-ended inclusion, that is, "including but not limited to". The term "or" means "and/or" unless specifically stated otherwise. The term "based on" means "based at least in part on". The terms "one example embodiment" and "one embodiment" mean "at least one example embodiment." The term "another embodiment" means "at least one additional embodiment." The terms "first", "second", etc. may refer to different or the same objects. Other explicit and implicit definitions may also be included below.

As mentioned above, the traditionally collected POI articles are scattered in various applications or websites, causing inconvenience in subsequent searches. After finding a desired article, it is still necessary to manually determine the POI, which is time-consuming and labor-intensive.

To at least partially address one or more of the above-mentioned problems and other potential problems, example embodiments of the present disclosure propose a scheme for POI information management. In this solution, a webpage link is obtained. A webpage text associated with the webpage link is obtained. At least one item of POI information matching the webpage text is obtained from a POI information database. At least one item of the POI information is presented. In this way, the POI information can be extracted from shared webpage links and presented, so as to facilitate unified collection. It should be understood that sharing described in the specification should at least include sharing a link from a third-party application through a sharing function and sharing the link by copying.

Hereinafter, specific examples of the technical solution will be described in more details with reference to the accompanying drawings.

Figure 1A:
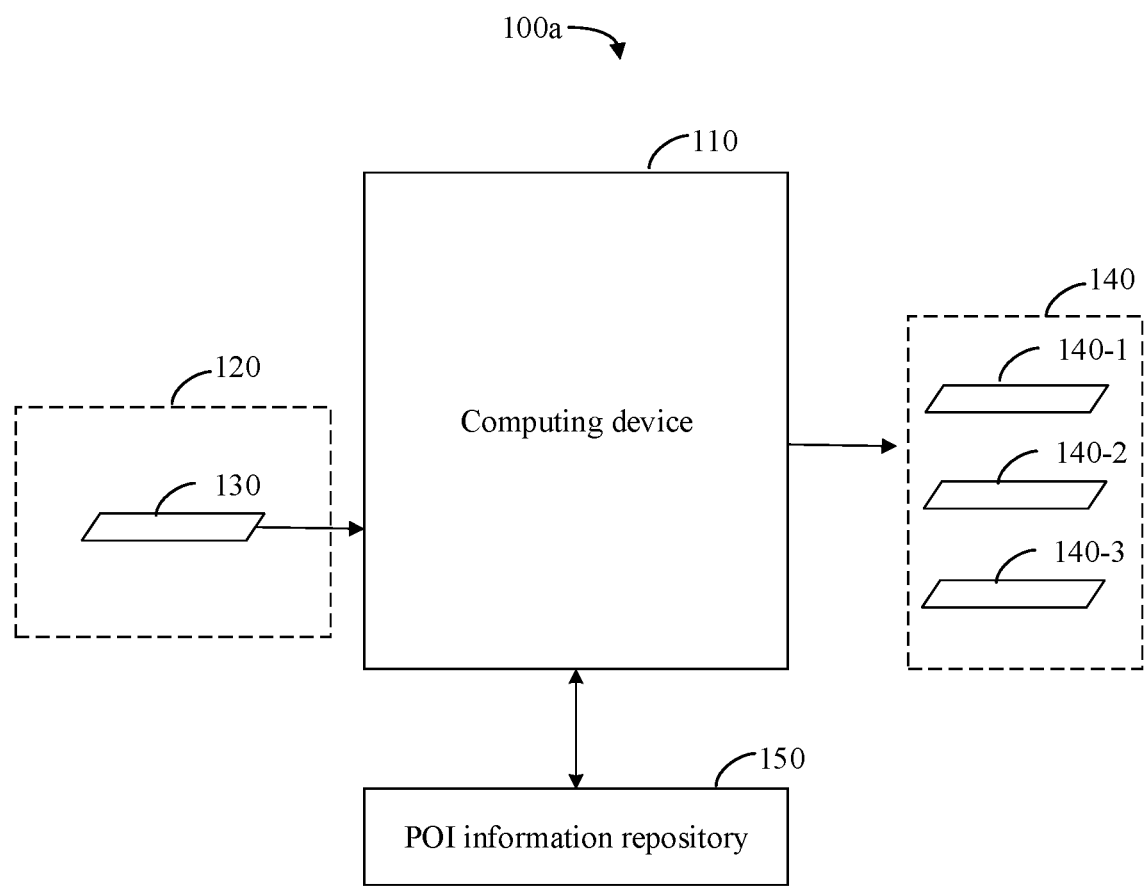
FIGS. 1A and 1B are schematic diagrams of information processing environments 100a and 100b according to some embodiments of the present disclosure.
Figure 1B:
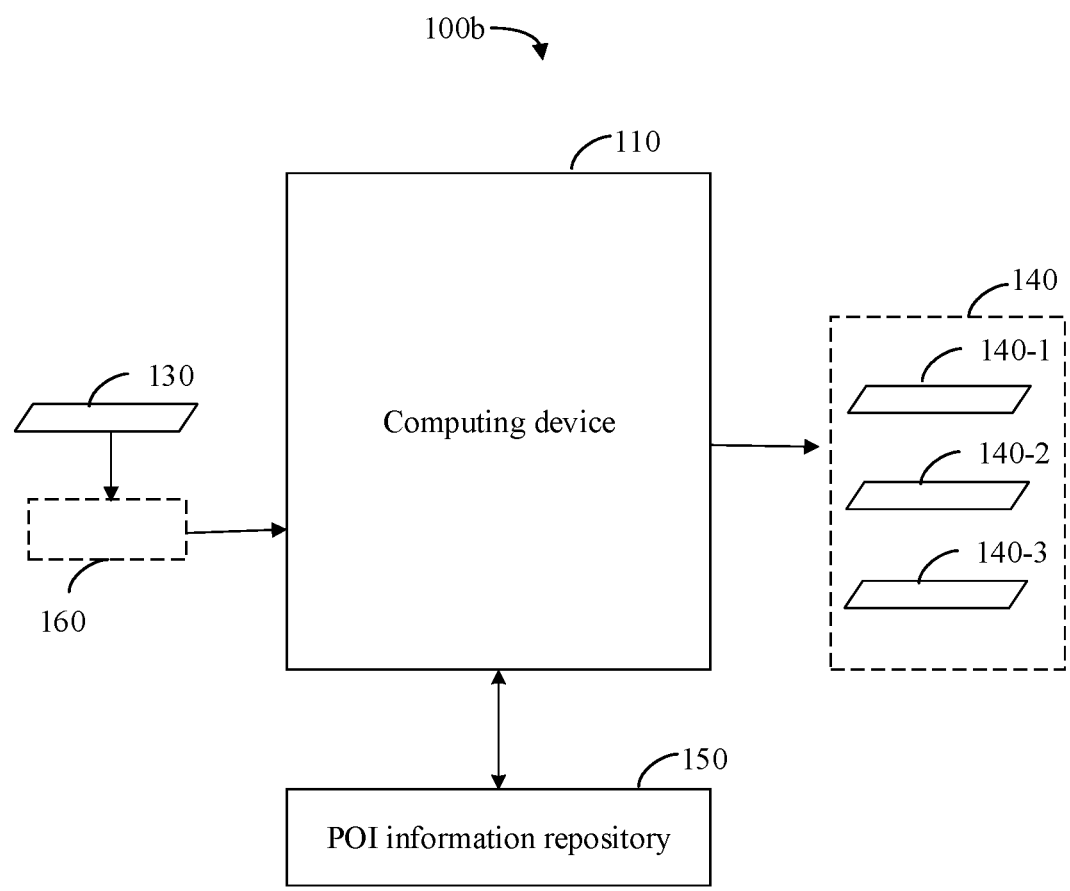

FIGS. 1A and 1B are schematic diagrams of information processing environments 100a and 100b according to some embodiments of the present disclosure.

The information processing environments 100a and 100b may include a computing device 110, a webpage link 130, at least one item of the POI information 140, and a POI information repository 150. In some embodiments, the webpage link 130 may be obtained via a clipboard 120, as shown in FIG. 1A. In addition, the webpage link 130 may also be obtained through a sharing module 160 based on a sharing function, as shown in FIG. 1B. It should be understood that although three items of POI information 140-1, 140-2, and 140-3 are shown in both FIG. 1A and FIG. 1B, this is just an example, and the number of the items of POI information may be more or less. The scope of the present disclosure is not limited herein.

The computing device 110 includes, for example, but is not limited to, a smart phone, a personal computer, a desktop computer, a laptop computer, a tablet computer, a personal digital assistant, and the like.

An operating system of the computing device 110 may transfer data, such as webpage links, between multiple applications through sharing. In the information processing environment 100a shown in FIG. 1A, the operating system of the computing device 110 can transfer data, such as the webpage links, between multiple applications through the clipboard 120 by means of copying. For example, a first application in the computing device 110 may present the webpage link 130. Upon receiving a copy link instruction from a user, the first application may copy the webpage link to the clipboard 120, and then a second application may obtain the webpage link 130 from the clipboard 120. However, in the information processing environment 100b shown in FIG. 1B, the operating system of the computing device 110 can also directly transfer data (e.g., webpage links) through the sharing function of an application program. For example, the first application in the computing device 110 may select to share the webpage link 130 to the second application through the sharing function, and then the second application is automatically opened and the webpage link 130 can be obtained.

When using the sharing function to perform data transfer, the sharing function of the specified application needs to be activated in advance. The sharing of the specified application needs to support the ability to open a third-party application (i.e., another application different from the specified application, such as the first application described above). It should also be noted that when an application runs on different platforms, prerequisites for transferring data through the sharing function may be slightly different. Differences between the prerequisites for transferring the data through the sharing function in Android system and the sharing function in iOS system will be described in detail below.

In Android system, to obtain a webpage link through the sharing function, the application needs to first register a browser access function. For example, an implicit intent is created in advance to select the application used to call a shared content. In this way, when the third-party application is used to browse a webpage and initiate a browser access operation, the application program that has registered for the browser access may be displayed. The user may launch the application by selecting the application. At the same time, a link address of the webpage currently browsed by the third-party application is inputted into the application.

In iOS system, a share extension needs to be created in advance. Specifically, a sharing extension needs to be created in advance for a specified application, and the sharing extension needs to be activated. As such, when browsing the webpage with the third-party application and clicking the share button, the activated share extension will be displayed. The application can be launched through selecting the share extension of the specified application, and at the same time the link address of the webpage currently browsed by the third-party application is inputted into the application.

The POI information repository 150 may be located on a remote server, which may be communicatively connected to the computing device 110. The POI information repository 150 may store a plurality of items of the POI information, and the plurality of items of the POI information may include, for example, POI identifiers, POI locations or addresses, POI descriptions, and related images, and the like. The computing device 110 may search the POI information repository 150 through a search engine. For example, searches may be performed for a POI identifier or a POI location, and matching item of the POI information may be obtained from the POI information repository 150.

The computing device 110 is configured to obtain the webpage link 130, obtain the webpage text associated with the webpage link 130, obtain at least one item of the POI information 140 matching the webpage text from the POI information repository 150, and present the at least one item of the POI information 140.

Thus, the POI information 140 can be extracted and presented from the shared webpage link, such that the user can collect the POI information 140 in a unified manner.

Figure 2:
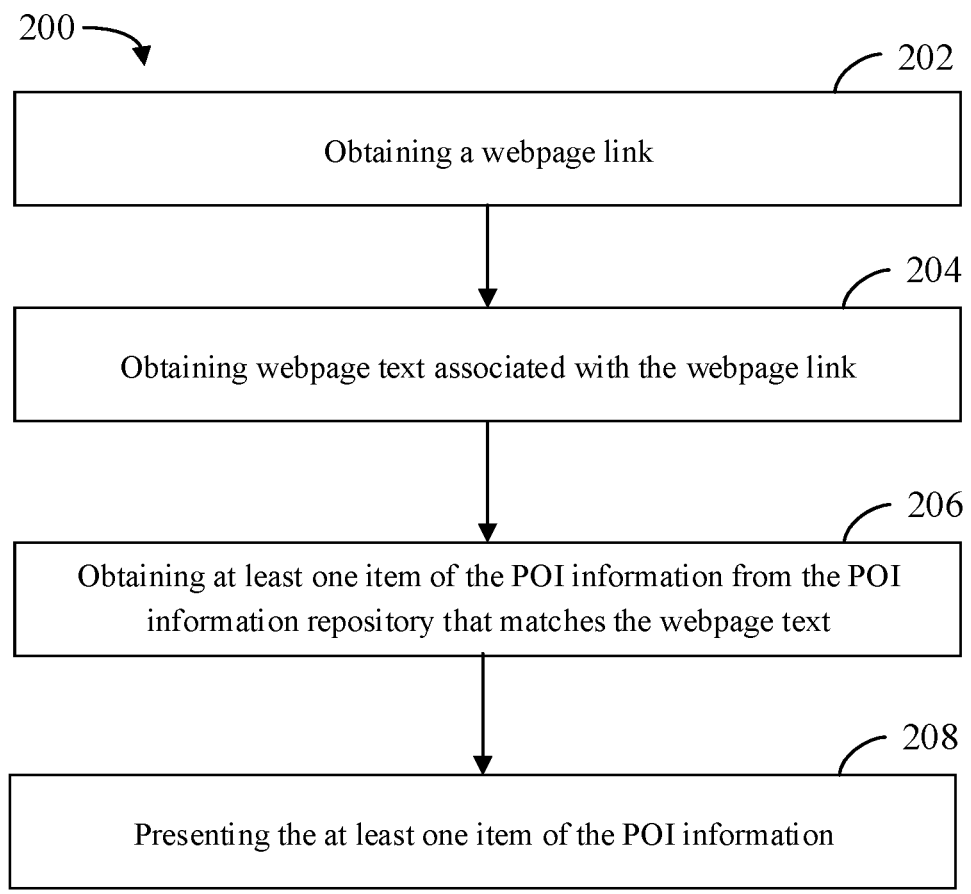
FIG. 2 is a flowchart of an exemplary method 200 for POI information management according to some embodiments of the present disclosure.

FIG. 2 is a flowchart of an exemplary method 200 for POI information management according to some embodiments of the present disclosure. For example, the method 200 may be performed by the computing device 110 as shown in FIG. 1. It should be understood that the method 200 may include additional blocks not shown and/or may omit blocks shown. The scope of the present disclosure is not limited therein.

At 202, the computing device 110 obtains a webpage link 130. In some embodiments, the computing device 110 may obtain the webpage link 130 from the clipboard 120. In some other embodiments, the computing device 110 may obtain the webpage link 130 through the sharing module 160. In the scenario of obtaining the webpage link 130 from the clipboard 120, the webpage link 130 in the clipboard 120 may be, for example, copied by the user from a certain application or webpage into the clipboard 120. The scenario of obtaining the webpage link 130 through the sharing module 160 will be described in detail below.

At 204, the computing device 110 obtains the webpage text associated with the webpage link 130. For example, the computing device 110 may obtain webpage data associated with the webpage 130, analyze the webpage data, and obtain the webpage text based on the analysis. In some embodiments, the obtained webpage text may be webpage text in Chinese. It should be understood that the webpage data described herein is not limited to the webpage data in text format, and may include the webpage data in image format, audio format, and video format. The webpage data in image format may be analyzed by, for example, an optical character recognition (OCR) method to obtain a text content. The webpage data in audio format and video format may be transcribed to obtain the text content.

At 206, the computing device 110 obtains at least one item of the POI information 140 from the POI information repository 150, that matches the webpage text. For example, the computing device 110 may obtain a keyword from the webpage text, and obtain the at least one item of the POI information 140 from the POI information repository 150, that matches the keyword. A method of obtaining the at least one item of the POI information 140 will be described in detail below.

At 208, the computing device 110 presents the at least one item of the POI information 140. For example, the at least one item of the POI information 140 may be presented in list format.

The POI information can be extracted from the shared webpage link and can then be presented, such that the user can collect the POI information uniformly, support one-stop POI information management, eliminate a need of searching for relevant articles in various applications or websites and manually extracting the POI information, and improve efficiency.

Figure 11A:
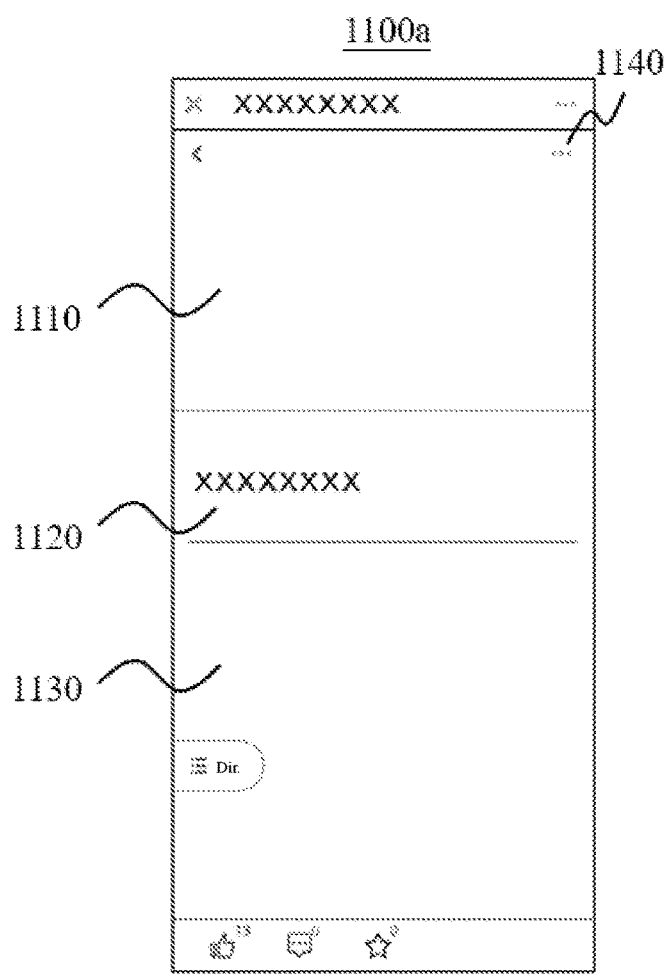
FIGS. 11A to 11C are schematic diagrams of an interface for obtaining a webpage link 130 based on a sharing function according to some embodiments of the present disclosure.
Figure 11B:
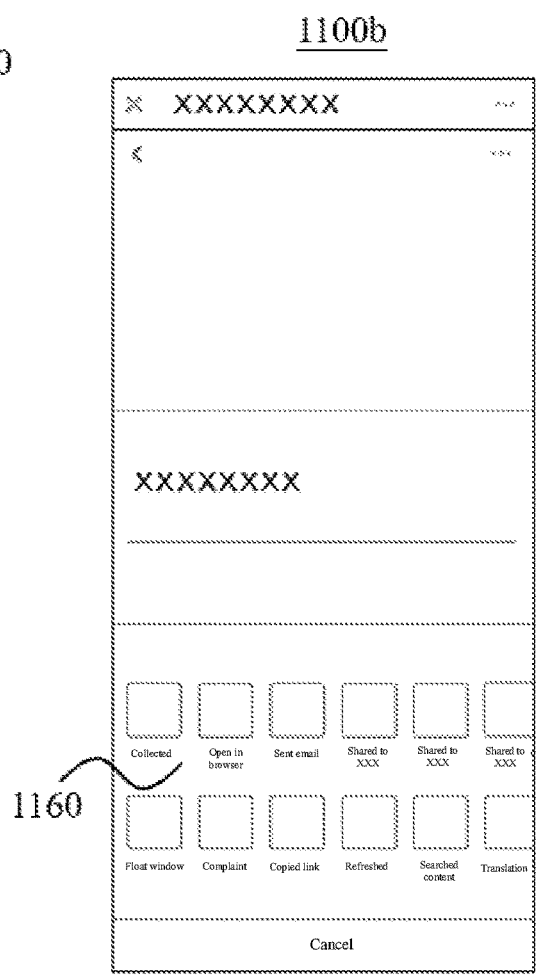
Figure 11C:
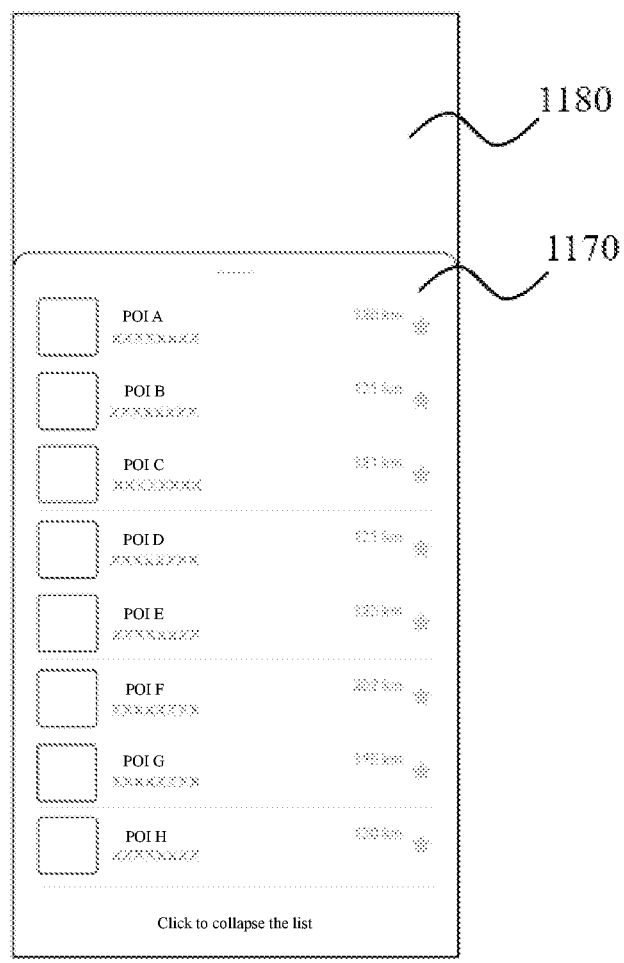

FIGS. 11A to 11C are schematic diagrams of an interface for obtaining a webpage link 130 based on a sharing function according to some embodiments of the present disclosure.

FIG. 11A is a schematic diagram of an interface 1100a when the first application in the computing device 110 is browsing a webpage. The interface 1100a may include an image display area 1110, a title display area 1120, and a text display area 1130. When reading the webpage, the user may click or swipe up and down to browse contents of the webpage. When finding a content of interest, the user may click a 3-dot icon 1140 in the upper right corner of the interface 1100a to share the content of interest.

After the 3-dot icon 1140 is clicked, the interface 1100a is switched to an interface 1100b, as shown in FIG. 11B. The interface 1100b may include a pop-up window 1160 in the lower portion thereof. The user may select an icon in the lower pop-up window 1160 to share the content of the webpage. For example, the user may select "Open in browser" icon or "Share to XXX" icon in the lower pop-up window 1160 to share the webpage link 130 to another application, for example, a car connected or telematics application.

After specifically designating a second application to share the webpage link 130, the second application automatically launches and obtains the webpage link 130 shared by the first application. At this time, the interface is switched or jumps to an interface 1100c. In the interface 1100c, the at least one item of the POI information is presented in a webpage pop-up window 1170. In some embodiments, the POI information presented in the webpage pop-up window 1170 may include a POI name, address information, and a distance from a current location. Additionally, the webpage content linked to by the webpage link 130 is presented in an area 1180.

Figure 3:
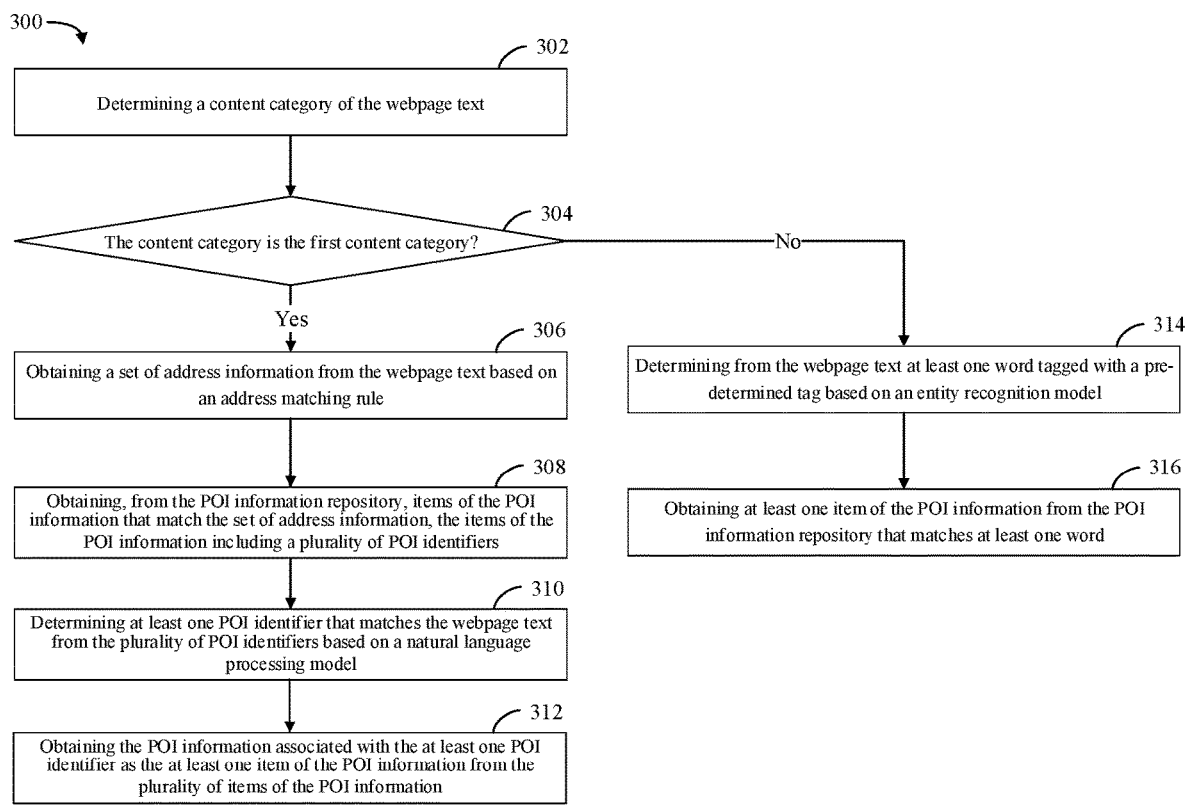
FIG. 3 is a flowchart of a method 300 for obtaining at least one item of POI information 140 according to some embodiments of the present disclosure.

FIG. 3 is a flowchart of a method 300 for obtaining at least one item of the POI information 140 according to some embodiments of the present disclosure. For example, the method 300 may be performed by the computing device 110 shown in FIG. 1. It should be understood that the method 300 may include additional blocks not shown and/or may omit blocks shown. The scope of the present disclosure is not limited therein.

At 302, the computing device 110 determines a content category of the webpage text.

In some embodiments, the computing device 10 may obtain a set of words that match words in a word database from the web page text. The word database can be, for example, generated based on high-frequency words extracted from a training text set. High-frequency words can be understood as words that rank in top n positions of occurrences in the training text set. The computing device 110 may then input the set of words into a text classification model to obtain a content category of the webpage text. The text classification model includes, but is not limited to, for example, textCNN. The content category may include a first content category and a second content category. The first content category includes, but is not limited to, for example, food, and the second content category includes, but is not limited to, for example, attractions.

For example, a number of occurrences of words in the training text set can be counted, and the words that rank in the top n positions of occurrences can be formed into the word database. A content category label, such as the first content category or the second content category, can be marked on the training text set to obtain a label set. During the training process, a set of words matching the word database can be obtained from the training text, and then a feature matrix can be generated based on the set of words. The feature matrix can be inputted into the text classification model (such as textCNN) for training. The training result can be compared with a target matrix transformed by the label associated with the training text. A loss value is calculated for gradient descent. For example, a loss function can use cross-entropy, and an activation function can use ReLU. The model can be tested on the test set and the best trained model can be saved for prediction.

At 304, the computing device 110 determines whether the content category is the first content category. The first content category includes, for example, a gourmet category.

If the computing device 110 determines at 304 that the content category is the first content category, then at 306, the computing device 110 obtains a set of address information from the webpage text based on an address matching rule. The set of address information may include, for example, one or more items of the address information, such as an address string.

In some embodiments, the computing device 110 may obtain valid text information from the webpage text based on regular expressions. Examples of regular expressions include but are not limited to ([0-9a-zA-Z]*[\u4e00-\u9fa5]+[0-9a-zA-Z]*)+(\\([\u4e00-\u9fa5]+\\))*. Valid text information includes, for example, numbers, letters and/or Chinese words and other information.

Subsequently, the computing device 110 may obtain a set of address information from the valid text information based on the address matching rule. For example, the address matching rule includes, but is not limited to, "road#/lane/street/building/shopping mall". The address information in the obtained set of address information may be, for example, "No. 30 Tianyaoqiao Road", "No. 10 Middle Fuxing Road", and the like.

As such, the valid text information can be extracted first according to regular expressions, and the address information can be obtained from the valid text information based on the address matching rule, thereby avoiding interference of invalid text information on address information extraction, and improving the efficiency and accuracy of the address information extraction.

At 308, the computing device 110 obtains, from the POI information repository 150, items of the POI information that match the set of address information. The items of the POI information include a plurality of POI identifiers. An item of the POI information may include, for example, a POI identifier, a POI address, POI coordinates, a POI type, and/or a POI image, and the like. The POI information matching the set of address information refers to POI information whose POI address matches any address information in the set of address information.

The POI information repository 150 may be located on a remote server. The computing device 110 may send a search request to the remote server for each address information in the set of address information. The search request includes the address information. Subsequently, the remote server searches the POI information repository 150 based on the received address information, determines multiple POI addresses matching the address information, and obtains multiple POI information associated with the multiple POI addresses and returns them to the computing device 110.

At 310, the computing device 110 determines at least one POI identifier that matches the webpage text from the plurality of POI identifiers based on a natural language processing model. The method for determining the at least one POI identifier matching the webpage text will be described in detail below with reference to FIG. 5.

At 312, the computing device 110 obtains the POI information associated with the at least one POI identifier as the at least one item of the POI information 140 from the plurality of items of the POI information.

Returning to 304, if the content category is determined to be the second content category at 304, then at 314, the computing device 110 determines from the webpage text at least one word tagged with a pre-determined tag based on an entity recognition model. The second content category includes, for example, the attractions category. For example, the computing device 110 may tag the at least one word in the webpage text with the pre-determined tag based on the entity recognition model, and then obtain the at least one word tagged with the predetermined tag.

Figure 7:
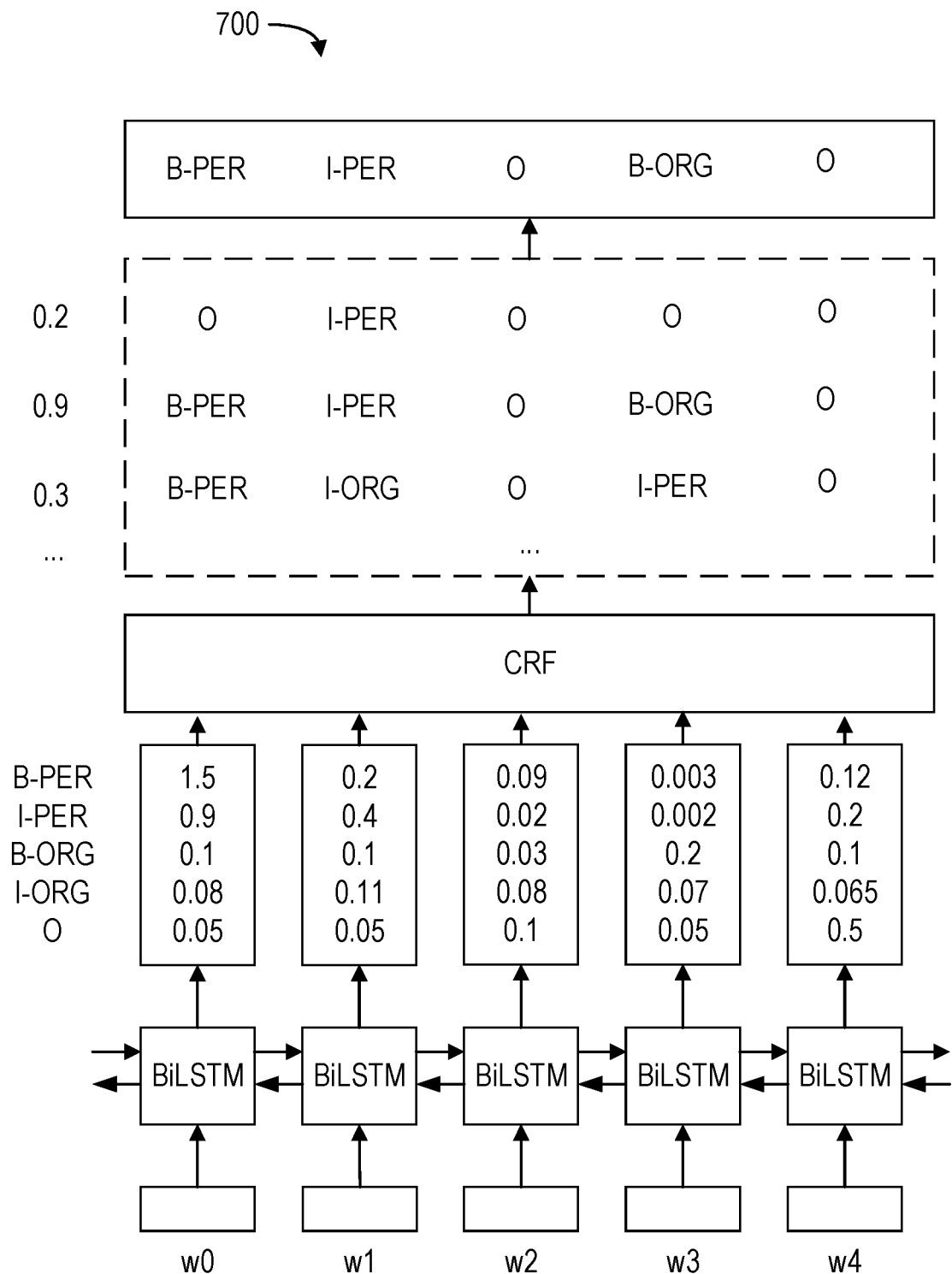
FIG. 7 is a schematic structural diagram of an entity extraction model 700 according to some embodiments of the present disclosure.

For example, the entity recognition model may adopt a combined structure of a bidirectional long-short-term memory network (BiLSTM) and a conditional random field (CRF). For example, as shown in FIG. 7, strings in the webpage text (e.g., "West Lake is so beautiful") are converted into word vectors w0-w4, and then the word vectors w0-w4 are inputted into BiLSTM to obtain scores of each word corresponding to each category or each tag (e.g., B-PER, B-ORG, I-ORG, I-PER, O, B-SPT (custom attraction category or tag), etc.) In one example of the word vector w0, an output of a BiLSTM node includes 1.5 (B-Person), 0.9 (I-Person), 0.1 (B-Organization), 0.08 (I-Organization), and 0.05 (O). The scores will be inputs to a CRF layer. A CRF loss function is used to avoid tagging bias. An optimization goal is to maximize probability of a true sequence. A global optimal sequence may be quickly obtained by using Viterbi algorithm. A tag sequence corresponding to the strings such as {B-PER, I-PER, O, B-ORG, O} is finally outputted. It should be understood that the above description is intended to be merely exemplary, and the scope of the present disclosure is not limited herein.

The pre-determined tag includes, but is not limited to, an attraction tag. For example, names of attractions in the training text (e.g., West Lake, Lingyin Temple, etc.) can be tagged with the attraction tag. The words in the training text can be tagged according to the BIOES standard to obtain a dataset. The dataset includes a training dataset and a testing dataset. The training text may be pre-processed. For example, special symbols may be removed, and incorrect tags may be removed. Then, the model can be trained on the training dataset in batches. Each iteration is evaluated with the testing dataset to save the best model. The saved entity recognition module may tag at least one word in the inputted webpage text with a predetermined tag.

In some embodiments, the computing device 110 may further perform a full character matching between the webpage text and an attraction entity database to obtain a matching word, and add the matching word to the above at least one word.

At 316, the computing device 110 obtains at least one item of the POI information 140 from the POI information repository 150 that matches at least one word. The at least one item of the POI information matching the at least one word refers to at least one item of the POI information whose POI identifier matches the at least one word.

Therefore, because names of gourmet restaurants vary widely, which may include letters, numbers and/or Chinese characters, and the restaurants change frequently, it is possible that the restaurants introduced in the article have been closed. Moreover, because the number of restaurants is huge, it is impossible to train the algorithm model through big data tagging. The model needs to be updated frequently and retrained. Thus, a combined method of address matching and word matching is suitable for obtaining the POI information such as gourmet restaurants from an article about gourmet restaurants. On the other hand, data in the attraction category are relatively stable, a data size can also be estimated, and names are relatively simple. The POI information can be extracted more intelligently through training the model. As such, by first determining the content category of the webpage text, and extracting the POI information through address matching and word matching when the content category is food, and extracting POI information through entity recognition when the content category is the attractions category. The advantages of combining the two categories make the extraction of POI information more efficient.

Figure 4:
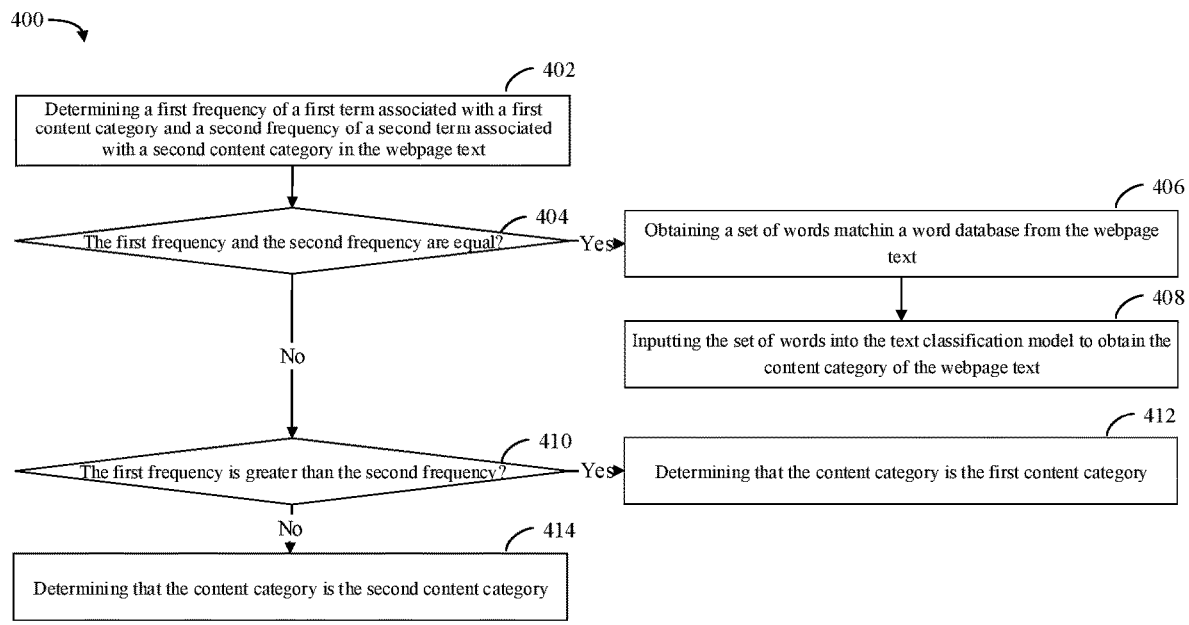
FIG. 4 is a flowchart of a method 400 for determining a content category of a webpage text according to some embodiments of the present disclosure.

FIG. 4 is a flowchart of a method 400 for determining a content category of a webpage text according to some embodiments of the present disclosure. For example, the method 400 may be performed by the computing device 110 shown in FIG. 1. It should be understood that the method 400 may include additional blocks not shown and/or may omit blocks shown. The scope of the present disclosure is not limited therein.

At 402, the computing device 110 determines a first frequency of a first term associated with a first content category and a second frequency of a second term associated with a second content category in the webpage text. For example, the first term includes, but is not limited to, "eat", "meal", "food", etc., and the second term includes, but is not limited to, "view", etc.

In some embodiments, the computing device 10 may obtain title information from the webpage text, and determine the first frequency of the first term associated with the first content category and the second frequency of the second term associated with the second content category in the title information.

In some other embodiments, the computing device 10 may determine the first frequency of the first term associated with the first content category and the second frequency of the second term associated with the second content category in the title information and body information of the webpage text.

At 404, the computing device 110 determines whether the first frequency and the second frequency are equal.

If the computing device 110 determines that the first frequency and the second frequency are equal, at 406, the computing device 110 obtains a set of words that match the word database from the webpage text.

At 408, the computing device 110 inputs the set of words into the text classification model to obtain the content category of the webpage text. For a process of determining the content category based on the text classification model, references can be made to the previous description, and details will be omitted herein.

If the computing device 110 determines that the first frequency and the second frequency are not equal, at 410, the computing device 110 determines whether the first frequency is greater than the second frequency.

If the computing device 110 determines that the first frequency is greater than the second frequency at 410, at 412, the computing device 110 determines that the content category is the first content category.

It should be understood that although it is described herein that whether the first frequency and the second frequency are equal is determined before whether the first frequency is greater than the second frequency is determined, the sequence is only an example. It is also possible to determine whether the first frequency is smaller than the second frequency. Alternatively, whether the first frequency is greater than the second frequency may be determined before whether the first frequency is smaller than the second frequency is determined, or vice versa.

If the computing device 110 determines that the first frequency is smaller than the second frequency at 410, at 414, the computing device 110 determines that the content category is the second content category.

As such, it is possible to quickly determine the content category based on the frequency of the words associated with the content category occurring in the webpage text. In case the content category cannot be easily determined based on the frequency, the text classification model may be used to determine the content category. In addition, it is more quickly to determine the content category through determining the frequency in the title information of the webpage text.

Figure 5:
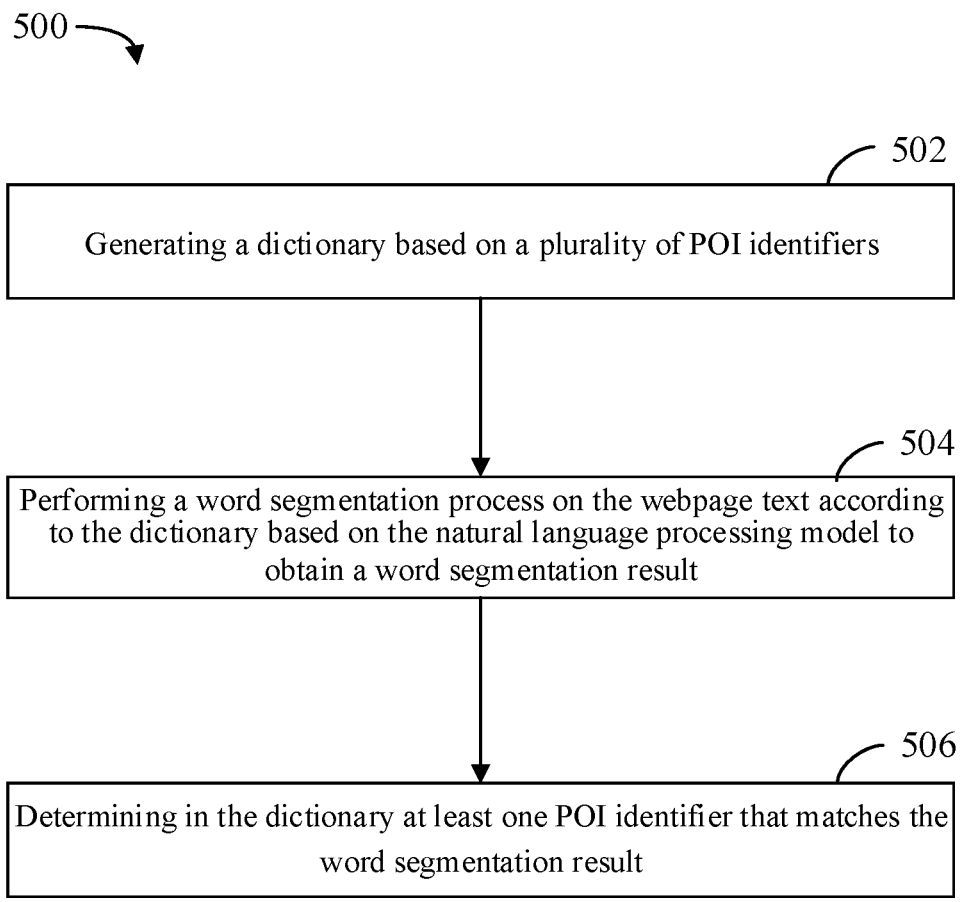
FIG. 5 is a flowchart of a method 500 for determining at least one POI identifier matching a webpage text according to some embodiments of the present disclosure.

FIG. 5 is a flowchart of a method 500 for determining at least one POI identifier matching a webpage text according to some embodiments of the present disclosure. For example, the method 500 may be performed by the computing device 110 shown in FIG. 1. It should be understood that the method 500 may include additional blocks not shown and/or may omit blocks shown. The scope of the present disclosure is not limited therein.

At 502, the computing device 110 generates a dictionary based on a plurality of POI identifiers.

At 504, the computing device 110 performs a word segmentation process on the webpage text according to the dictionary, based on the natural language processing model, to obtain a word segmentation result. The word segmentation result may include word segments.

For example, the natural language processing model may include, but is not limited to, a Chinese word segmentation algorithm with forward maximum name matching or reverse longest matching. Taking the forward maximum name matching as an example, assuming that the longest word in the dictionary is a string of i Chinese characters, the first i characters in a current string of the webpage text may be used as the word segment to be matched, and the dictionary is searched. If such string (i.e., the word segment to matched) exists in the dictionary at this time, the match is successful, and the matched word segment is extracted. If the match fails, the last character is removed from the word segment to be matched, and the string including the remaining characters is searched in the dictionary. The process continues until the match is successful, that is, a word segment can be extracted or a length of the remaining string is zero. At this time, a matching cycle is completed. Then another matching cycle for a subsequent string of Chinese characters will be performed. The same process is repeated until the entire webpage text is scanned, and the word segmentation result is obtained. The reverse longest matching algorithm is similar, but in an opposite direction, and details will not be repeated herein.

At 506, the computing device 110 determines in the dictionary at least one POI identifier that matches the word segmentation result. For example, the dictionary is searched one by one for each of multiple word segments in the word segmentation result to determine the at least one matching POI identifier.

Thus, the webpage text can be segmented by using the POI identifiers matching the address information in the webpage text as the dictionary. The POI identifiers can be matched based on the word segmentation result, such that the POI identifiers that appear in the webpage text can be more accurately determined when both the address information and the word segments are used in matching.

Alternatively or additionally, in some embodiments, the computing device 110 may also determine at least one frequency of the at least one POI identifier in the word segmentation result. For example, the multiple word segments in the word segmentation result are matched one by one with the at least one POI identifier to determine the at least one frequency thereof. Subsequently, the computing device 110 may sort the at least one POI identifier according to the at least one frequency. For example, sorting may be performed by the number of occurrences from high to low.

Thus, the POI identifiers can be sorted based on the frequency of each POI identifier that appears in the word segmentation result, such that the presented POI information is sorted according to the frequencies.

Alternatively or additionally, in some embodiments, the computing device 110 may also delete the POI identifier whose frequency in the word segmentation result is lower than a pre-determined frequency threshold from the at least one POI identifier that has been sorted.

Thus, the obtained POI identifiers may be the POI identifiers that appear frequently in the word segmentation result, such that the obtained POI identifiers are more consistent with requirements and the user experience is improved.

Figure 6:
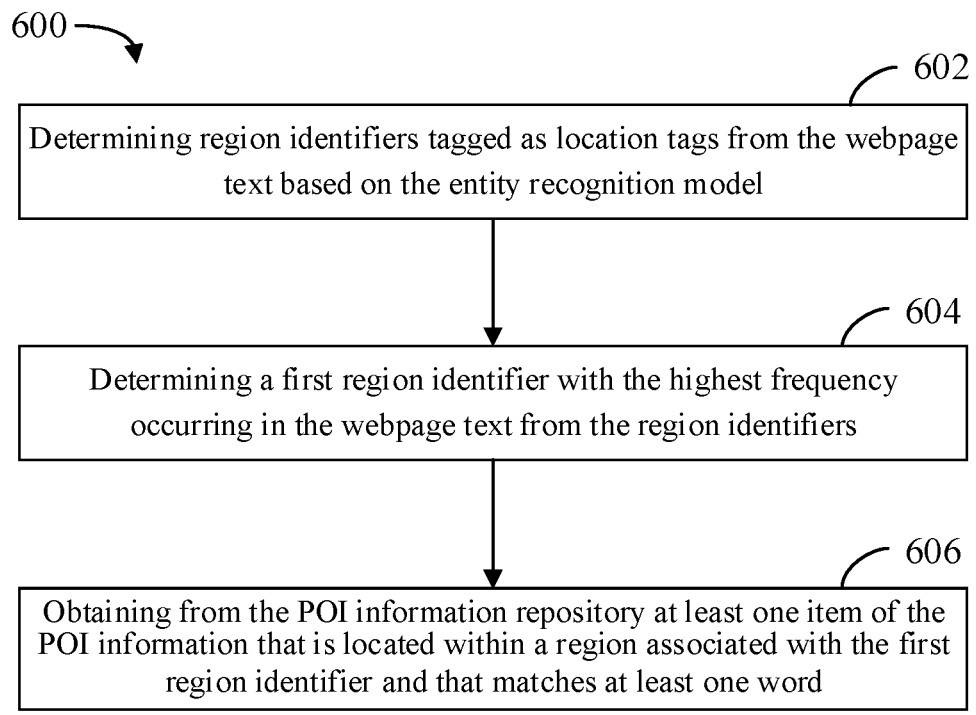
FIG. 6 is a flowchart of a method 600 for obtaining at least one item of the POI information matching at least one word according to some embodiments of the present disclosure.

FIG. 6 is a flowchart of a method 600 for obtaining at least one item of the POI information matching at least one word according to some embodiments of the present disclosure. For example, the method 600 may be performed by the computing device 110 shown in FIG. 1. It should be understood that the method 600 may include additional blocks not shown and/or may omit blocks shown. The scope of the present disclosure is not limited therein.

At 602, the computing device 110 determines region identifiers tagged as location tags from the webpage text based on the entity recognition model. For example, each region identifier may include, but is not limited to, a city identifier, such as Shanghai, Beijing, Hangzhou, and other places. For example, in addition to the attraction tag described above, the region identifiers (e.g., Beijing, Shanghai, etc.) in the training text can also be tagged as location tags. The words in the training text can be tagged according to the BIOES standard to obtain a dataset. The dataset includes a training dataset and a testing dataset. The specific model and training can be found in the previous description, and details will not be repeated herein.

At 604, the computing device 110 determines a first region identifier with the highest frequency occurring in the webpage text from the region identifiers. For example, if the webpage text mentions Hangzhou once, Shanghai three times, and Beijing ten times, it can be determined that the highest frequency is Beijing.

At 606, the computing device 110 obtains from the POI information repository 150 at least one item of the POI information that is located within a region associated with the first region identifier and that matches at least one word. If the at least one word determined above relates to People's Park, then the first region identifier is Beijing, and the relevant POI information of People's Park located in Beijing is obtained from the POI information repository 150.

Thus, by further identifying the region identifier from the webpage text and defining the region of matching POI according to the region identifier with the highest frequency, the POI information is matched more accurately.

Alternatively or additionally, in some embodiments, the computing device 110 may also obtain images associated with webpage links.

Subsequently, the computing device 110 may obtain text information in the images. For example, the computing device 110 may obtain the text information from an image based on a text recognition model. For example, the computing device 110 may first determine a text position in the image based on a scene text detection model such as cnstd. Then, the computing device 110 obtains a part of the image at the text position from the image, and then the computing device 110 obtains the text information from the part of the image based on an optical text recognition model, such as cnocr.

Subsequently, the computing device 110 obtains a first POI location that matches the text information from the POI information repository 150. In some embodiments, the computing device 110 may also obtain location information in attributes of the image as the first POI location. For example, the location information may include, but is not limited to, longitude and latitude information.

The computing device 110 may determine at least one first credibility score associated with the at least one item of the POI information based on a distance between the at least one POI location in the at least one item of the POI information and the first POI location. For example, for the item of the POI information whose distance from the first POI location exceeds a pre-determined distance threshold, the first credibility score may be a first value, such as 30. For the item of the POI information whose distance from the first POI location does not exceed the pre-determined distance threshold, the first credibility score may be a second value, such as 60, that is greater than the first value.

The computing device 110 may also obtain at least one item of user evaluation data associated with the at least one item of the POI information from a pre-determined server. For example, the pre-determined server may include, but is not limited to, food and attraction review website servers. For example, the user evaluation data includes, but is not limited to, user evaluation popularity, user ratings, and the like.

The computing device 110 may determine at least one second credibility score associated with the at least one item of the POI information based on the at least one item of user evaluation data. For example, user ratings may be averaged and then multiplied by a popularity coefficient to obtain the second credibility score. A low popularity coefficient corresponds to a low popularity, and a high popularity coefficient corresponds to a high popularity. For example, the popularity can be divided into 3 levels, popularity 1-3. For example, the popularity coefficient corresponding to popularity 1 is 50%, the popularity coefficient corresponding to popularity 2 is 75%, and the popularity coefficient corresponding to popularity 3 is 100%.

Then, the computing device 110 determines at least one final credibility score associated with the at least one item of the POI information based on the at least one first credibility score and the at least one second credibility score. For example, the final credibility score may be obtained by weighted addition of the first credibility score and the second credibility score. For example, a weight coefficient of the first credibility score is 60%, and a weight coefficient of the second credibility score is 40%.

The computing device 110 ultimately presents the at least one final credibility score. In some embodiments, the computing device 110 may rank the at least one item of the POI information based on the at least one final credibility score and present the ranked at least one item of the POI information. For example, the computing device 110 may sort the at least one item of the POI information based on the at least one final reliability score to obtain a sorted result. The computing device 110 may then present the sorted results.

Thus, the credibility score of the POI information can be determined by combining multiple dimensions such as the location information related to the images in the webpage link and user comment data of the POI, and credibility evaluation can be given to the user. In addition, the items of the POI information can also be sorted and presented according to the credibility scores, such that the more credible items of the POI information are ranked higher.

Figure 8:
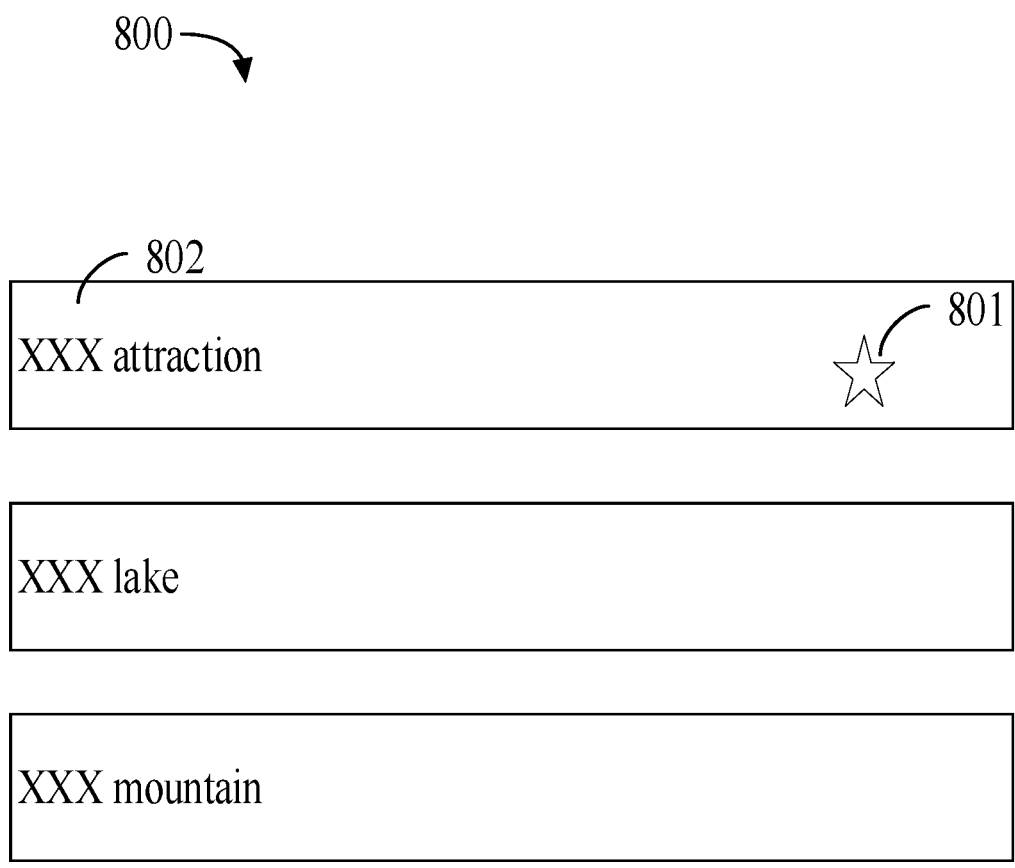
FIG. 8 is a schematic diagram of a first presentation interface 800 according to some embodiments of the present disclosure.

Alternatively or additionally, in some embodiments, as shown in FIG. 8, the computing device 110 may also present at least one selectable icon associated with the at least one item of the POI information. It should be understood that although a shape of the selectable icon shown in FIG. 8 is a star, this is for illustration only, and the shape of the selectable icon may be any suitable other shape, including but not limited to a circle, and a square, etc.

If the computing device 110 determines that a selection operation on the first selectable icon 801 of the at least one selectable icon is detected, the computing device 110 adds the first item of the POI information 802 associated with the first selectable icon 801 to a favorite POI list. It should be understood that the first selectable icon and the first item of the POI information herein may be one or more. The favorite POI list may be previously created, or may be newly created based on the webpage link. The favorite POI list may be stored locally on the computing device 110 or may be sent to a server for storage, thereby facilitating subsequent access to the favorite POI list.

Thus, the selected item of the POI information can be saved according to a user operation for a subsequent access.

Alternatively or additionally, in some embodiments, the computing device 110 may also determine whether a pre-determined operation on the first item of the POI information of the at least one item of the POI information is detected. For example, the pre-determined operation includes, but is not limited to, clicking, double-clicking, long-pressing, and the like.

Figure 9:
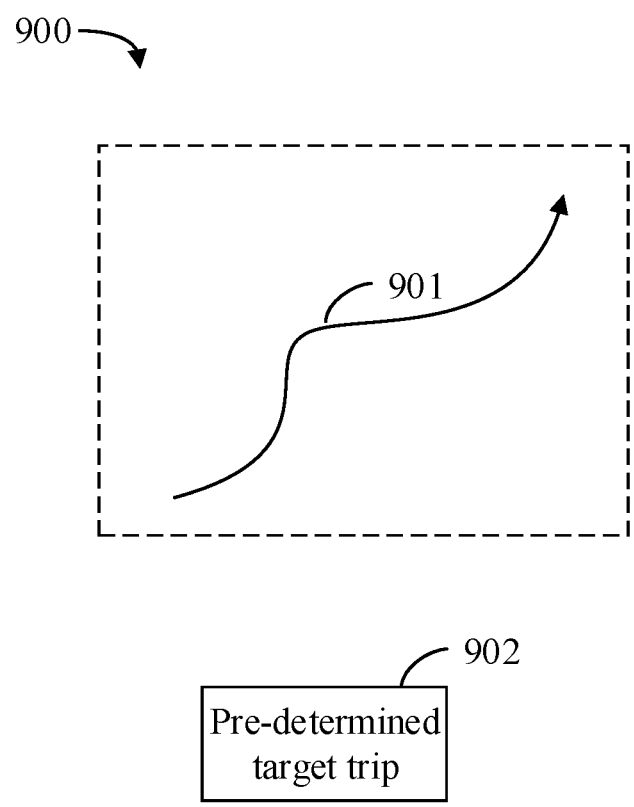
FIG. 9 is a schematic diagram of a second presentation interface 900 according to some embodiments of the present disclosure.

If the computing device 110 determines that a selection operation on the first item of the POI information is detected, a route 901 from the current location to the address indicated in the first item of the POI information and a first operable icon 902 may be presented as shown in FIG. 9. As shown in FIG. 9, the first operable icon 902 may also indicate a description about a preset target trip. It should be understood that although the first operable icon 902 shown in FIG. 9 is in a shape of a button, this is only an example, and the shape of the first operable icon may also be other suitable shapes. In some embodiments, if the computing device 110 determines that the selection operation on the first item of the POI information is detected, the image included in the first item of the POI information may also be presented.

The computing device 110 may also determine whether a pre-determined operation on the first operable icon 902 is detected. The pre-determined operation can be referred to above description, and details will not be repeated herein.

If the computing device 110 determines that the pre-determined operation on the first operable icon 902 is detected, the route may be set as the target trip.

Thus, after selecting the first item of the POI information, the route to the address indicated by the first item of the POI information can be presented, and can be set as a target itinerary according to a user operation, thereby eliminating the need for the user to search for the route for the POI and improving the user experience.

Figure 10:
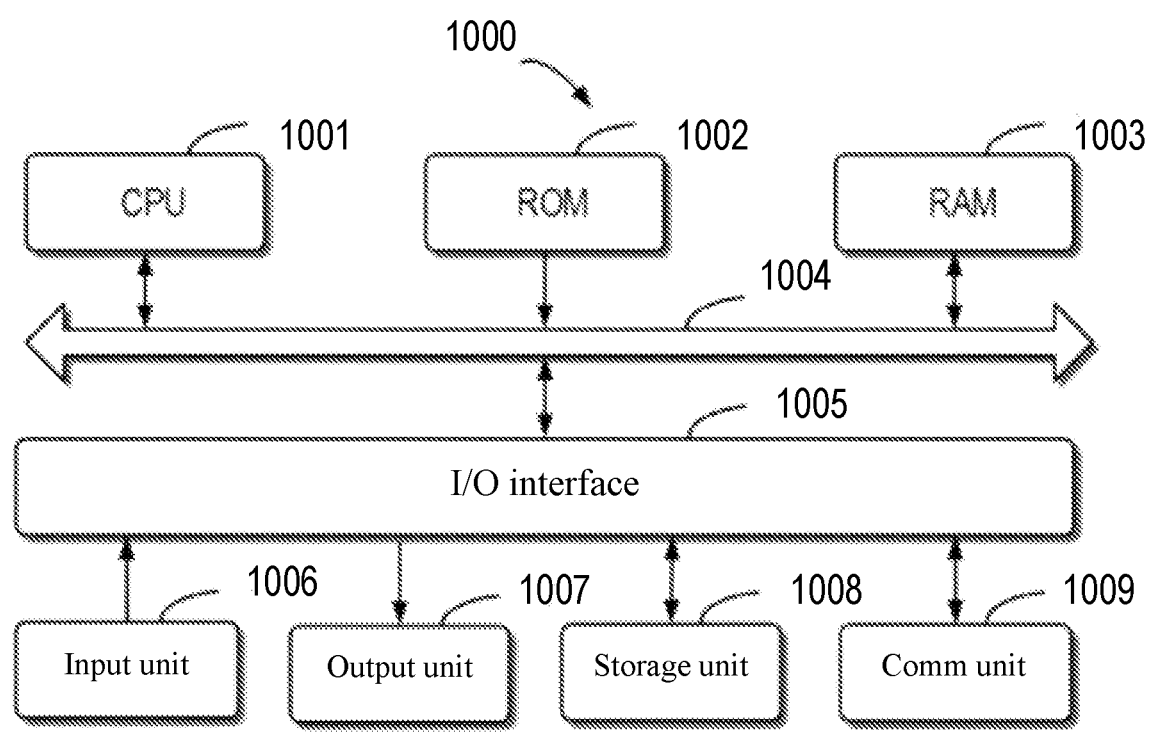
FIG. 10 is a schematic structural diagram of an exemplary electronic device for performing the method for POI information management according to some embodiments of the present disclosure.

FIG. 10 is a schematic structural diagram of an exemplary electronic device 1000 for performing the method for POI information management according to some embodiments of the present disclosure. For example, the computing device 110 shown in FIG. 1 may be implemented by the electronic device 1000. As shown in FIG. 10, the electronic device 1000 includes a central processing unit (CPU) 1001. The CPU 1001 is configured to perform various appropriate actions and processes according to computer program instructions stored in a read-only memory (ROM) 1002 or computer program instructions loaded from a storage unit 1008 into a random-access memory (RAM) 1003. Further, various programs and data necessary for the operation of the electronic device 1000 can also be stored in the RAM 1003. The CPU 1001, the ROM 1002, and the RAM 1003 are connected to each other through a bus 1004. An input/output (I/O) interface 1005 is also connected to the bus 1004.

A plurality of components in the electronic device 1000 are connected to the I/O interface 1005. The plurality of components include: an input unit 1006, such as a keyboard, a mouse, a microphone, etc.; an output unit 1007, such as various types of displays, speakers, etc.; a storage unit 1008, such as a disk, CD-ROM, etc.; and a communication unit 1009, such as a network card, a modem, a wireless communication transceiver, etc. The communication unit 1009 facilitates the electronic device 1000 to exchange information/data with other devices through a computer network such as the Internet and/or various telecommunication networks.

The various steps and processes described above, e.g., the methods 200-600, may be performed by the central processing unit 1001. For example, in some embodiments, the methods 200-600 may be implemented as a computer program tangibly embodied on a machine-readable medium, such as the storage unit 1008. In some embodiments, part or all of the computer program may be loaded and/or installed on the electronic device 1000 via the ROM 1002 and/or the communication unit 1009. When the computer program is loaded into the RAM 1003 and executed by the CPU 1001, one or more of the actions of the methods 200-600 described above may be performed.

The present disclosure relates to methods, apparatus, systems, electronic devices, computer-readable storage media, and/or computer program products. A computer program product may include computer readable program instructions for carrying out various aspects of the present disclosure.

The computer-readable storage medium may be a tangible device that can hold and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination of the above. More specific examples (non-exhaustive list) of computer-readable storage medium include: portable computer disks, hard disks, random access memory (RAM), read only memory (ROM), erasable programmable read only memory (EPROM) or flash memory, static random access memory (SRAM), portable compact disk read-only memory (CD-ROM), digital versatile disks (DVD), memory sticks, floppy disks, mechanically coded devices, such as printers with instructions stored thereon hole cards or raised structures in grooves, and any suitable combination of the above. The computer-readable storage medium, as used herein, may not be construed as transient signals per se, such as radio waves or other freely propagating electromagnetic waves, electromagnetic waves propagating through waveguides or other transmission media (e.g., light pulses through fiber optic cables), or through electrical wires transmitted electrical signals. The computer-readable program instructions described herein may be downloaded to various computing/processing devices from the computer-readable storage medium, or to an external computer or external storage device over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives the computer-readable program instructions from the network and forwards the computer-readable program instructions for storage in the computer-readable storage medium in each computing/processing device.

The computer program instructions for carrying out operations of the present disclosure may be assembly instructions, instruction set architecture (ISA) instructions, machine instructions, machine-dependent instructions, microcode, firmware instructions, state setting data, or source or object codes written in any combination of one or more programming languages. The programing languages may include object-oriented programming languages, such as Smalltalk, C++, etc., and conventional procedural programming languages, such as the "C" language or similar programming languages. The computer-readable program instructions may execute entirely on the user's computer, partly on the user's computer, as a stand-alone software package, partly on the user's computer and partly on a remote computer, or entirely on the remote computer or server. In the case of the remote computer, the remote computer may be connected to the user's computer through any kind of networks, including a local area network (LAN) or a wide area network (WAN), or may be connected to the external computer (e.g., using an Internet service provider to connect). In some embodiments, custom electronic circuits, such as programmable logic circuits, field programmable gate arrays (FPGAs), or programmable logic arrays (PLAs), can be personalized by utilizing state information of the computer-readable program instructions. The electronic circuits may execute the computer-readable program instructions to implement various aspects of the present disclosure.

Various aspects of the present disclosure are described herein with reference to flowcharts and/or block diagrams of the methods, the apparatus (systems), and the computer program products according to the embodiments of the disclosure. It will be understood that each step and/or block of the flowcharts and/or the block diagrams, and combinations thereof can be implemented by the computer readable program instructions.

These computer-readable program instructions may be provided to a processing unit of a general-purpose computer, special purpose computer or other programmable data processing apparatus to produce a machine for implementing the functions/acts specified in one or more steps and/or blocks of the flowcharts and/or block diagrams, when the computer-readable program instructions are executed by the processing unit of the computer or other programmable data processing apparatus. The computer-readable program instructions can also be stored in the computer readable storage medium, and cause the computer, the programmable data processing apparatus and/or other equipment to operate in a specific manner, such that the computer-readable medium on which the computer-readable program instructions are stored includes an article of manufacture comprising instructions for implementing various aspects of the functions/acts specified in one or more steps and/or blocks of the flowcharts and/or block diagrams.

The computer-readable program instructions can also be loaded onto the computer, other programmable data processing apparatus, or other equipment to cause a series of operational steps to be performed on the computer, other programmable data processing apparatus, or other equipment to produce a computer-implemented process, thereby causing computer-readable program instructions executed on the computer, other programmable data processing apparatus, or other device to implement the functions/acts specified in one or more steps and/or blocks of the flowcharts and/or block diagrams.

The flowcharts and block diagrams in the drawings illustrate the architecture, functionality, and operation of possible implementations of systems, methods and computer program products according to various embodiments of the present disclosure. In this regard, each step or block in the flowcharts or block diagrams may represent a module, segment, or portion of instructions, which includes executable instructions for implementing one or more specified logical functions. In some embodiments, the functions noted in the blocks may occur out of the order noted in the drawings. For example, two blocks in succession may, in fact, be executed substantially concurrently, or the blocks may sometimes be executed in a reverse order, depending upon the functionality involved. It is also noted that each block and/or step of the block diagrams and/or flowcharts, and the combinations thereof, can be implemented in dedicated hardware-based systems that perform the specified functions or actions, or can be implemented in a combination of dedicated hardware and computer instructions.

Various embodiments of the present disclosure have been described above, and the foregoing descriptions are exemplary, not exhaustive, and not limiting of the disclosed embodiments. Numerous modifications and variations will be apparent to those of ordinary skill in the art without departing from the scope and spirit of the described embodiments. The terminology used herein was chosen to best explain the principles of the embodiments, the practical applications or technical improvements in the marketplace, or to enable others of ordinary skill in the art to understand the embodiments disclosed herein.

What is claimed is:

1. A point-of-interest (POI) information management method, comprising:
   obtaining a webpage link, the webpage link being from a first application;
   obtaining, at a second application, a webpage text associated with the webpage link;
   obtaining at least one item of POI information matching the webpage text from a POI information repository;
   presenting the at least one item of the POI information;
   in response to a pre-determined operation being performed on a first item of the POI information of the at least one item of the POI information, presenting a route from a current location to an address indicated in the first item of the POI information and a first operable icon; and
   in response to detecting another pre-determined operation is performed on the first operable icon, setting the route as a target trip,
wherein the obtaining the at least one item of the POI information matching the webpage text from the POI information repository includes:
   determining a content category of the webpage text;
   in response to the content category being determined to be a second content category, determining at least one word tagged with a pre-determined tag from the webpage text based on an entity recognition model; and
   obtaining the POI information associated with the at least one word from the POI information repository to be the at least one item of the POI information.

2. The method according to claim 1, wherein obtaining the at least one item of the POI information matching the webpage text from the POI information repository includes:
   in response to the content category being determined to be a first content category, obtaining a set of address information from the webpage text based on an address matching rule;
   obtaining items of the POI information matching the set of address information from the POI information repository, the items of the POI information including a plurality of POI identifiers;
   determining at least one POI identifier that matches the webpage text from the plurality of POI identifiers based on a natural language processing model; and obtaining the POI information associated with the at least one POI identifier from the items of the POI information to be the at least one item of the POI information.

3. The method according to claim 1, wherein determining the content category of the webpage text includes:
   determining a first frequency of a first term associated with the first content category and a second frequency of a second term associated with the second content category in the webpage text; and
   in response to determination of the first frequency being greater than the second frequency, determining the content category to be the first content category; or
   in response to determination of the first frequency being smaller than the second frequency, determining the content category to be the second content category; or
   in response to determination of the first frequency being equal to the second frequency, obtaining a set of words matching a word database from the webpage text and inputting the set of words into a text classification model to determine whether the content category is the first content category or the second content category.

4. The method according to claim 3, wherein determining the first frequency and the second frequency includes:
   obtaining title information from the webpage text; and
   determining the first frequency of the first term associated with the first content category and the second frequency of the second term associated with the second content category in the title information.

5. The method according to claim 1, wherein determining the at least one POI identifier that matches the webpage text from the plurality of POI identifiers based on the natural language processing model includes:
   generating a dictionary based on the plurality of POI identifiers;
   performing a word segmentation process on the webpage text according to the dictionary based on the natural language processing model to obtain a word segmentation result; and
   determining the at least one POI identifier that matches the word segmentation result in the dictionary.

6. The method according to claim 5, wherein determining the at least one POI identifier that matches the webpage text from the plurality of POI identifiers based on the natural language processing model further includes:
   determining at least one frequency of the at least one POI identifier in the word segmentation result; and
   according to the at least one frequency, sorting the at least one POI identifier.

7. The method according to claim 6, wherein determining the at least one POI identifier that matches the webpage text from the plurality of POI identifiers based on the natural language processing model further includes:
   deleting the POI identifier whose frequency in the word segmentation result is lower than a pre-determined frequency threshold from the at least one POI identifier that has been sorted.

8. The method according to claim 1, wherein obtaining the POI information associated with the at least one word from the POI information repository to be the at least one item of the POI information includes:
   determining region identifiers tagged as location tags from the webpage text based on the entity recognition model;
   determining a first region identifier with the highest frequency occurring in the webpage text from the region identifiers; and
   obtaining from the POI information repository the at least one item of the POI information that is located within a region associated with the first region identifier and that matches the at least one word.

9. The method according to claim 1, further comprising:
   obtaining an image associated with the webpage link;
   obtaining text information from the image based on a text recognition model;
   obtaining a first POI location matching the text information from the POI information repository;
   determining at least one first credibility score associated with the at least one item of the POI information based on a distance between the at least one POI location in the at least one item of the POI information and the first POI location;
   obtaining at least one item of user evaluation data associated with the at least one item of the POI information from a pre-determined server;
   based on the at least one item of user evaluation data, determining at least one second credibility score associated with the at least one item of the POI information;
   based on the at least one first credibility score and the at least one second credibility score, determining at least one final credibility score associated with the at least one item of the POI information; and
   presenting the at least one final credibility score.

10. The method according to claim 9, wherein presenting the at least one item of the POI information includes:
    based on the at least one final credibility score, sorting the at least one item of the POI information to obtain a sorted result; and
    presenting the sorted result.

11. The method according to claim 1, further comprising:
    presenting at least one selectable icon associated with the at least one item of the POI information; and
    in response to a selection operation being performed on a first selectable icon of the at least one selectable icon, adding the first item of the POI information associated with the first selectable icon to a favorite POI list.

12. The method according to claim 1, wherein the entity recognition model comprises a bidirectional long-short-term memory network (BiLSTM) and a conditional random field (CRF).

13. The method according to claim 1, wherein a first content category comprises a food-related category, and the second content category comprises an attractions-related category.

14. The method according to claim 1, wherein the webpage link is obtained via a clipboard or a sharing function.

15. An electronic device, comprising:
    at least one processor; and
    a memory coupled to the at least one processor;
    wherein the memory stores instructions being executed by the at least one processor, and when being executed by the at least one processor, the instructions cause the at least one processor to perform:
       obtaining a webpage link, the webpage link being from a first application;
       obtaining, at a second application, a webpage text associated with the webpage link;
       obtaining at least one item of POI information matching the webpage text from a POI information repository;
       presenting the at least one item of the POI information;
       in response to a pre-determined operation being performed on a first item of the POI information of the at least one item of the POI information, presenting a route from a current location to an address indicated in the first item of the POI information and a first operable icon; and in response to detecting another pre-determined operation is performed on the first operable icon, setting the route as a target trip, wherein when obtaining the at least one item of the POI information matching the webpage text from the POI information repository, the at least one processor is further configured to:

determine a content category of the webpage text;

in response to the content category being determined to be a second content category, determine at least one word tagged with a pre-determined tag from the webpage text based on an entity recognition model; and obtain the POI information associated with the at least one word from the POI information repository to be the at least one item of the POI information.

16. The electronic device according to claim 15, wherein when obtaining the at least one item of the POI information matching the webpage text from the POI information repository, the at least one processor is further configured to:

in response to the content category being determined to be a first content category, obtain a set of address information from the webpage text based on an address matching rule;

obtain items of the POI information matching the set of address information from the POI information repository, the items of the POI information including a plurality of POI identifiers;

determine at least one POI identifier that matches the webpage text from the plurality of POI identifiers based on a natural language processing model; and obtain the POI information associated with the at least one POI identifier from the items of the POI information to be the at least one item of the POI information.

17. The electronic device according to claim 16, wherein when determining the content category of the webpage text, the at least one processor is further configured to:

determine a first frequency of a first term associated with the first content category and a second frequency of a second term associated with the second content category in the webpage text; and in response to determination of the first frequency being greater than the second frequency, determine the content category to be the first content category; or in response to determination of the first frequency being smaller than the second frequency, determine the content category to be the second content category; or in response to determination of the first frequency being equal to the second frequency, obtain a set of words matching a word database from the webpage text and inputting the set of words into a text classification model to determine whether the content category is the first content category or the second content category.

18. A non-volatile computer-readable storage medium storing computer instructions, wherein:

when being executed by at least one processor, the instructions cause the at least one processor to perform:

obtaining a webpage link, the webpage link being from a first application;

obtaining, at a second application, a webpage text associated with the webpage link;

obtaining at least one item of POI information matching the webpage text from a POI information repository;

presenting the at least one item of the POI information;

in response to a pre-determined operation being performed on a first item of the POI information of the at least one item of the POI information, presenting a route from a current location to an address indicated in the first item of the POI information and a first operable icon; and in response to detecting another pre-determined operation is performed on the first operable icon, setting the route as a target trip, wherein when obtaining the at least one item of the POI information matching the webpage text from the POI information repository, the at least one processor is further configured to:

determine a content category of the webpage text;

in response to the content category being determined to be a second content category, determine at least one word tagged with a pre-determined tag from the webpage text based on an entity recognition model; and obtain the POI information associated with the at least one word from the POI information repository to be the at least one item of the POI information.

19. The non-volatile computer-readable storage medium according to claim 18, wherein when obtaining the at least one item of the POI information matching the webpage text from the POI information repository, the at least one processor is further configured to:

in response to the content category being determined to be a first content category, obtain a set of address information from the webpage text based on an address matching rule;

obtain items of the POI information matching the set of address information from the POI information repository, the items of the POI information including a plurality of POI identifiers;

determine at least one POI identifier that matches the webpage text from the plurality of POI identifiers based on a natural language processing model; and obtain the POI information associated with the at least one POI identifier from the items of the POI information to be the at least one item of the POI information.

20. The non-volatile computer-readable storage medium according to claim 19, wherein when determining the content category of the webpage text, the at least one processor is further configured to:

determine a first frequency of a first term associated with the first content category and a second frequency of a second term associated with the second content category in the webpage text; and in response to determination of the first frequency being greater than the second frequency, determine the content category to be the first content category; or in response to determination of the first frequency being smaller than the second frequency, determine the content category to be the second content category; or in response to determination of the first frequency being equal to the second frequency, obtain a set of words matching a word database from the webpage text and inputting the set of words into a text classification model to determine whether the content category is the first content category or the second content category.

* * * * *